Figure 1:
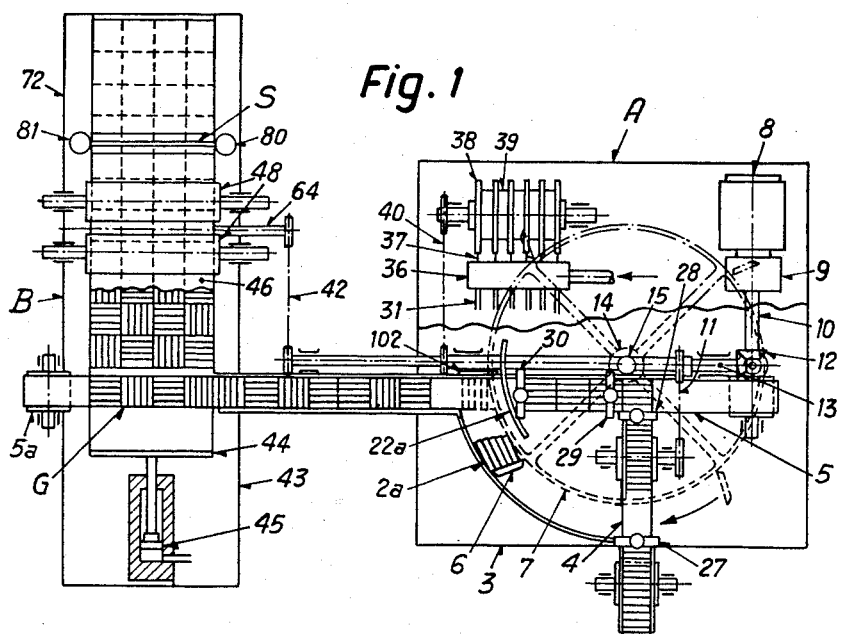

July 19, 1955 M. BAUMANN 2,713,380
MACHINE FOR THE PRODUCTION OF PAPER-GLUED FLOORING SLABS
Filed Aug. 7, 1953 2 Sheets-Sheet 1

INVENTOR:
Manfred Baumann
BY
Richards y Geier
ATTORNEYS

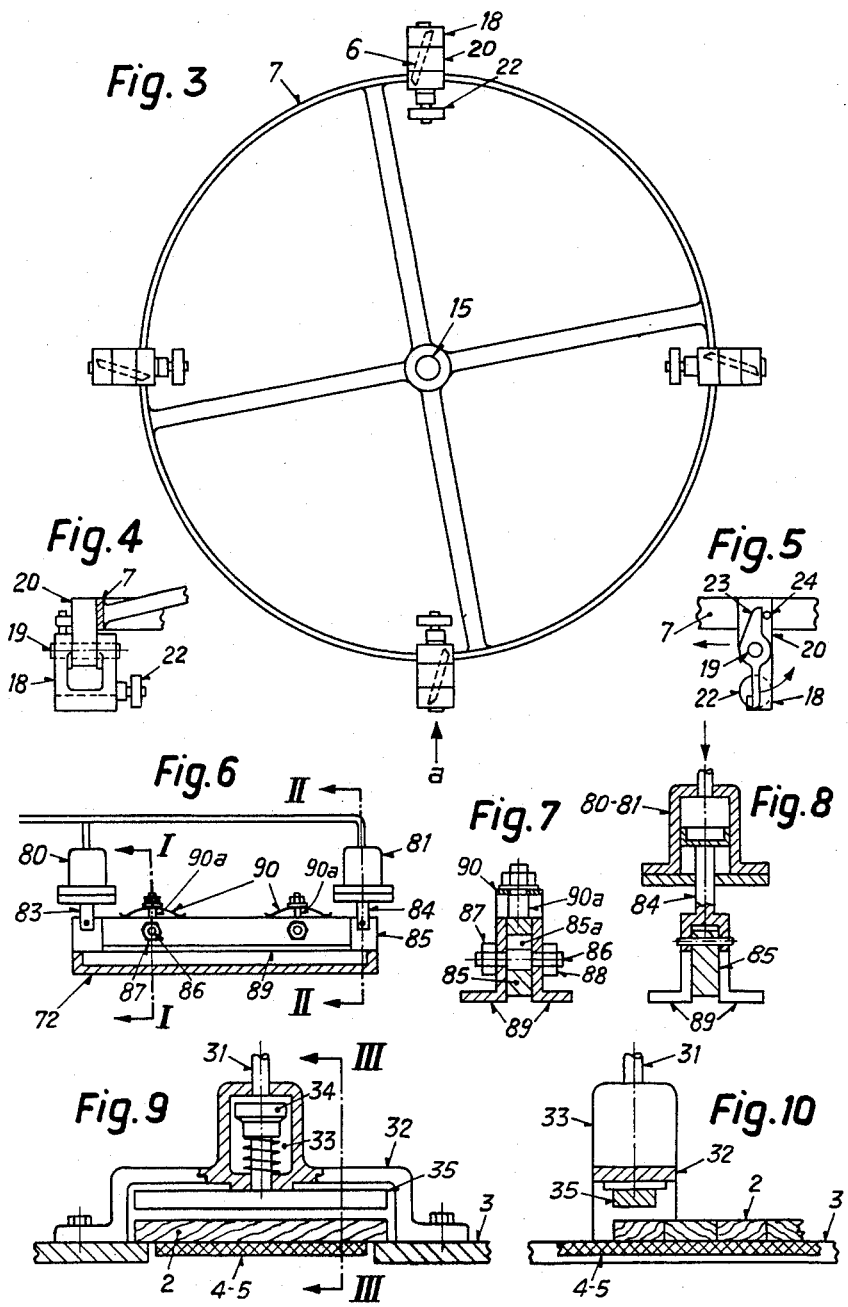

United States Patent Office 2,713,380
Patented July 19, 1955

2,713,380
MACHINE FOR THE PRODUCTION OF PAPER-GLUED FLOORING SLABS

Manfred Baumann, St. Margrethen, Switzerland

Application August 7, 1953, Serial No. 372,852

Claims priority, application Switzerland August 9, 1952

7 Claims. (Cl. 154—1.6)

The method of gluing small parquet strips on so-called floor fillets, whose width corresponds to the length of the strips, in such a way that a number of strips are arranged on the board crosswise and a number lengthwise to the direction of the board is well-known. Generally the strips are of such a width that four or even five strips placed side by side give a width which corresponds accurately to the length of the strips. In this manner small square slabs can be formed which can be laid side by side on a floor fillet either with the grain running uniformly or with the grain running alternately lengthwise and crosswise. These floor fillets are principally used for floors in wooden houses. On cement floors with a smooth surface such as those which are prepared in such a way that linoleum or a rubber covering can be affixed afterwards, the parquet strips can be glued directly on to the floor. The laying of single small slabs, comprising four or five strips, however, takes up too much time. Therefore several small slabs are placed side by side so as to form preferably square slabs comprising four lots of four small slabs and are held together by a strong paper which is glued on. The paper is glued on to that side of the strips which is designed as bearing surface and it protects the latter until the finished, laid floor is sand-papered.

Hitherto the joining of the single parquet strips into such slabs has been carried out by hand and the paper too has been glued by hand on to the strips placed side by side and thus forming slabs. This work takes up a great deal of time and substantially increases the cost of the flooring slabs.

The object of the present invention is to carry out this manual work automatically by a machine. The said invention consists in the fact that a distributing arrangement and a slab joining and paper gluing device are in operative connection with a feed conveyor belt, the distributing arrangement being provided with two conveyor belts at right angles to each other, one of which forms the extension of the feed belt and the other conveys the parquet strips out of the distributing arrangement to the slab joining and paper gluing device, several clamps for the strips and at least one axially rotating carrier being provided which work together in such a way that from the belt that conveys the strips to the cross belt groups of strips, each comprising several single strips reach the cross belt alternately directly by being slid and indirectly by the carrier, whereby the groups of strips are arranged side by side in the direction of running of the delivery belt lengthwise and crosswise to the latter, and that in addition the slab joining and paper gluing device attached to the distributing machine is provided with a slide for groups of strips, an apparatus for applying the glue, paper feeding and pressing rollers, which join the conveyed groups of strips into slabs and hold the latter together with glued on paper.

Figure 2:
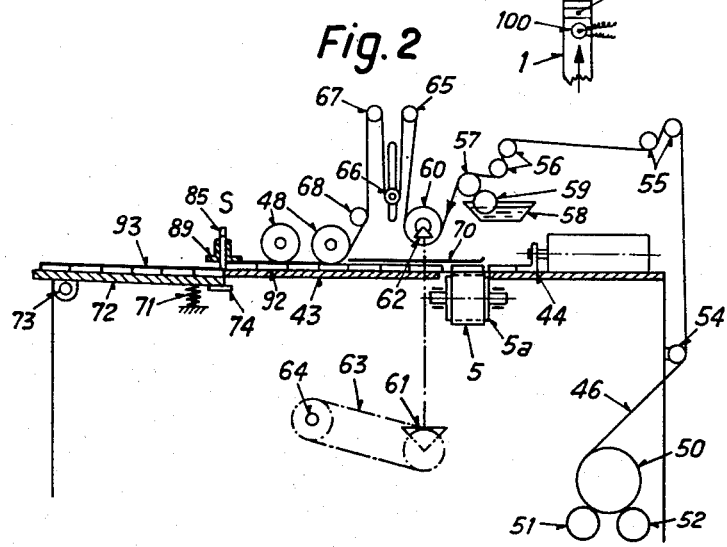

A typical example of the invention's manner of execution is illustrated in the attached drawing. In the drawing:

Fig. 1 a top view of the combination of the distributing machine and the joining and paper gluing device, Fig. 2 a side view of the joining and paper gluing device, Fig. 3 a top view of the carrier wheel with the four carriers attached to it, Fig. 4 a section through the rim of the carrier wheel with a side view of one of the carriers, Fig. 5 the carrier seen in the direction of arrow a, Fig. 3, Fig. 6 shows a front view of the device for cutting off the paper, Fig. 7 shows a section on an enlarged scale along line I—I in Fig. 6, Fig. 8 shows a section on an enlarged scale along line II—II in Fig. 6, Fig. 9 shows a device for clamping the parquet strips seen in part section from the front and Fig. 10 shows a sectional view of the same along line III—III in Fig. 9, seen from the side.

The machine comprises a distributing arrangement A and a slab joining and gluing device B. By means of a conveyor belt 1 parquet strips 2 are brought to the distributing arrangement A. The conveyor belt 1 serves at the same time as a check point for the strips 2 which are fed either from a machine or from a container. In the extension of the conveyor belt 1 there is arranged above the table 3 of the distributing arrangement A a running conveyor belt 4 which has an appropriately higher speed than conveyor belt 1. Transversely to the conveyor belt 4 there is arranged a conveyor belt 5 which conveys the strips to the slab joining and paper gluing apparatus B.

Since now the strips are to be arranged in groups of, for instance, five strips and laid side by side in such a way that the directions of the grain of two adjacent groups is at right angles, each four or five of the strips 2 which are lying crosswise on belt 4 must be transported on to belt 5 in such a way that they lie across the latter. This purpose is served by carriers 6 which are arranged on a carrier wheel 7 Fig. 3. The shaft 13 is driven by the motor 8, which is arranged beneath the table 3, via a reducing gear 9 and a shaft 10 as well as by a mitre gear 12; the vertical shaft 15, on which the carrier wheel 7 is arranged, is driven by shaft 13 via a mitre gear 14. In addition the motor 8 drives the conveyor belt 5 and conveyor belt 4 is driven via chain 11. On the carrier wheel 7 there are arranged carriers 6 Figs. 3, 4 and 5 which are attached to straps 18 Figs. 4 and 5 so that they swivel on the pins 19. The pins 19 are supported in bosses 20 which are welded on to the rim of the carrier wheel 7. In addition a pulley is secured to each of the straps 18. The latter are provided with a nose 23 which thrusts against the stop pin 24. The strap 18 is kept in a vertical position by means of a spring which is not here described more closely. The pulleys 22 run over a curve rail 22a secured to the table 3 and swivel the strap 18 so that the strips 2a carried by it are released.

In order now to enable the distributing of the strips to be effected clamps 27, 28, 29 and 30 are provided. These consist of a strap 32 which is provided with an air cylinder 33 with a piston 34 Fig. 9. The strap 32 overlaps the ends of the strips 2 and the conveyor belts 4 and 5 are somewhat narrower than the length of the strips 2. The latter thus lie with their ends supported on table 3 since the conveyor belts 4 and 5 run in recesses in the table 3, so that the surface of the said belts projects only slightly from the surface of the table. If now by means of the piston 34, on the rod of which is secured the pressure plate 35, a strip 2 lying beneath the pressure plate has its ends pressed on to the table 3, the belts 4 and 5 can nevertheless still move under the strip, but the feeding of further strips is prevented. The cylinders 33 are connected by means of air conduits 31 with a valve box 36 (Fig. 1) whose valve pistons 37 are controlled by the cams 38 of a drum cam 39. The drum cam 39 is driven by shaft 13 by means of a chain 40.

By means of conveyor belt 5 which turns over pulley 5a, the strips strung together into groups G are now slid into the slab joining and paper gluing apparatus B which is driven via chain 42. Four from each of the transported groups G are slid from belt 5 on to a table 43 of the gluing apparatus by a slide 44 which is actuated by the air piston 45. On to the four groups slid forward by the slide 44 so that they form a strip four groups wide a paper 46, coated with glue, is now affixed and pressed against the surface of the strips by means of the rollers 48. After four lots of four groups G have been slid forward one after the other the paper which has been glued on to them is cut by the cutting device S so that the slabs composed of four lots of four groups and held together by the glued paper can be removed from the apparatus B either manually or by means of a conveyor belt.

The feeding of the paper and the gluing device are illustrated in Fig. 2. From the roll of paper 50, which is supported on freely rotating pulleys 51 and 52, a paper strand 46 is fed over a bar 54, brake pulleys 55 and return pulleys 56 via a glue coating roller 57 which takes up the glue from the roller 59 which dips into the glue trough 58. The paper band is drawn by means of the rubber roller 60 which is driven by the shaft 64 via the mitre gears 61 and 62 and via the chain 63. Since the paper is continuously being drawn through the rubber roller 60, the feeding of the groups, however, being effected in a series of jerks, the paper strand is conveyed over the pulley 65, the movable weight pulley 66, the pulley 67 and the guide pulley 68 to beneath the pressing-on rollers 48. The paper strand 46 thereby forms a compensating loop which has the incidental advantage that the coating of glue has time to soak the paper adequately.

The surface of the table 43 is a few millimeters lower than the surface of the conveyor belt 5, so that the strips can be slid without resistance from the belt 5 on to the table 43 by the slide 44. The section above the strips to be slid off is covered with a plate 70, Fig. 2, so that the strips cannot rise up when being slid off. Along the surface of the groups slid forward beneath the plate 70, there now runs the paper strand 46, with its under side coated with a film of glue; this strand is pressed against the surface of the strips by the rollers 48 so that the paper is firmly affixed to the strips.

In the extension of the table 43 a folding table 72 is arranged which is swivellable about shaft 73 and is pressed by means of the spring 71 against a stop 74 which thrusts against the under side of the table 43. Now, as soon as, after four feed motions of the slide 44, a slab consisting of sixteen groups and glued together with paper has reached the table 72 the paper is cut by the cutting apparatus S so that the now finished slab can be removed from the table 72.

The table 72 can also be provided with a conveyor belt which transports the cut-off slab further. The apparatus illustrated in Figs. 6, 7 and 8 serves to cut off the paper. By means which are not here described more closely two cylinders 80 and 81 are secured to the table 43; a knife 85 is clamped to the piston rods 83 and 84 of the said cylinders. On the knife 85 and arranged shiftably in a transverse direction to it two angle tracks 89 are firmly jointed to one another by means of two pins 86, shouldered on both sides, and the nuts 87, 88. The connecting pins 86 of the angle tracks 89 are borne, so that they are shiftable in a vertical direction in the transverse slots 85a of the knife 85. By means of the springs 90 which are secured to the pins 90a of the knife 85 and which are supported on the angle tracks 89, the knife 85 is drawn upwards opposite the angle tracks. If now the piston rods 83 and 84 are forced downwards by the air pressure in the cylinders 80 and 81 and if the knife 85 is forced downwards too the springs 90 press one of the angle tracks 89 on to the slab which is still lying on the table 43 and press the edge of this slab on to the table 43 while the knife 85 sinks further downwards and presses on the slab supported on the tilting plate 72 so that the paper between the slabs 92 and 93 is severed. The process is as follows:

The strips 2 transported along conveyor belt 1 are controlled by the selenium cell 100 which serves to engage the motor 8. If there are strips on the conveyor belt 1 the motor is switched on and the wheel 7 as well as the two conveyor belts 4 and 5 are set in motion. The strips 2 arrive on to belt 4 from belt 1, move through beneath the clamp 27 and reach the clamp 28. If the latter is not under air pressure the strips 2 are slid crosswise on to the conveyor belt 5. Now, as soon as five parquet strips have been slid crosswise on to the conveyor belt 5 the clamps 27 and 28 are actuated so that they clamp the parquet strips 2 which are lying beneath the press plates 35. They stop the feed from the belt 4 and the following carrier 6 of the carrier wheel 7 seizes hold of a group 2a of five parquet strips which are lying crosswise on the belt 4 and slides them in a curve on to the belt 5 in front of the clamp 30, the pulley 22 running up a curve rail 22a so that the carrier 6 releases the parquet strips 2a which now rest against a stop 102. The next moment the three clamps 30, 27 and 28 are opened while the clamp 29 comes into operation. Once again parquet strips are slid from the belt 4 on to the belt 5 in the direction of running of the latter. The gap previously produced by the carrier 6 is filled up by parquet strips on the belt 4 and by the next carrier another five parquet strips are slid crosswise on to the belt 5 etc.

Since now in the joining together of groups, as can be seen from Fig. 1, an alteration in the position of the parquet strips must occur after the passing of four groups, the clamps are controlled by the cams 38 of the drum cam 39 in such a way that after three alternately arranged groups two uniformly arranged groups arrive on to the belt 5 so that the groups with alternate directions of grain are arranged side by side to form a slab.

Depending on the length of the parquet strips and on the size of the groups formed by them the finished slabs can be composed of more or fewer groups than has been illustrated in the typical example.

What I claim is:

1. A machine for the production of paper-glued flooring slabs, comprising a feed conveyor belt for feeding parquet strips placed parallel to each other upon the belt, a first distributing conveyor belt constituting a continuation of said feed belt and receiving the strips from the feed belt, a second distributing conveyor belt extending at right angles to the first distributing conveyor belt and having one end receiving strips from the first distributing conveyor belt, at least one carrier for holding a group of strips, rotary means connected with said carrier and swinging said carrier to remove a group of strips from the first distributing conveyor belt and place it upon the second distributing conveyor belt crosswise to strips received by said one end of the second distributing conveyor belt from the first distributing conveyor belt, a slide located adjacent the other end of the second distributing conveyor belt for removing therefrom groups of strips, a device for feeding paper to the removed groups of strips, a device for coating a surface of said paper with glue, and a device for applying the glue-carrying surface of the paper to the removed groups of strips to form flooring slabs.

2. A machine for the production of paper-glued flooring slabs, comprising a feed conveyor belt for feeding parquet strips placed parallel to each other upon the belt, a first distributing conveyor belt constituting a continuation of said feed belt and receiving the strips from the feed belt, a second distributing conveyor belt extending at right angles to the first distributing conveyor belt and having one end receiving strips from the first distributing conveyor belt, a clamp upon the first distributing conveyor belt, another clamp upon the second distributing conveyor belt, each of said clamps comprising a piston adapted to engage a strip and thereby to stop the feed of the strips upon a belt, pneumatic means operating said piston, a control cylinder for said pneumatic means and cams operating said pneumatic means at predetermined intervals, at least one carrier for holding a group of strips, rotary means connected with said carrier and swinging said carrier to remove a group of strips from the first distributing conveyor belt and place it upon the second distributing conveyor belt crosswise to strips received by said one end of the second distributing conveior belt from the first distributing conveyor belt, a slide located adjacent the other end of the second distributing conveyor belt for removing therefrom groups of strips, a device for feeding paper to the removed groups of strips, a device for coating a surface of said paper with glue, and a device for applying the glue-carrying surface of the paper to the removed groups of strips to form flooring slabs.

3. A machine for the production of paper-glued flooring slabs, comprising a feed conveyor belt for feeding parquet strips placed parallel to each other upon the belt, a first distributing conveyor belt constituting a continuation of said feed belt and receiving the strips from the feed belt, a second distributing conveyor belt extending at right angles to the first distributing conveyor belt and having one end receiving strips from the first distributing conveyor belt, a plurality of carriers for holding groups of strips, a horizontally rotating wheel carrying said carriers, means actuating said wheel to cause said carriers to remove groups of strips from the first distributing conveyor belt and place them upon the second distributing conveyor belt crosswise to strips received by said one end of the second distributing conveyor belt from the first distributing conveyor belt, a slide located adjacent the other end of the second distributing conveyor belt for removing therefrom groups of strips, a device for feeding paper to the removed groups of strips, a device for coating a surface of said paper with glue, and a device for applying the glue-carrying surface of the paper to the removed groups of strips to form flooring slabs.

4. A machine for the production of paper-glued flooring slabs, comprising a feed conveyor belt for feeding parquet strips placed parallel to each other upon the belt, a first distributing conveyor belt constituting a continuation of said feed belt and receiving the strips from the feed belt, a second distributing conveyor belt extending at right angles to the first distributing conveyor belt and having one end receiving strips from the first distributing conveyor belt, at least one carrier for holding a group of strips, rotary means connected with said carrier and swinging said carrier to remove a group of strips from the first distributing conveyor belt and place it upon the second distributing conveyor belt crosswise to strips received by said one end of the second distributing conveyor belt from the first distributing conveyor belt, a gluing table, a slide located adjacent the other end of the second distributing conveyor belt for removing therefrom groups of strips and placing them upon said table, pneumatic means operating said slide, a device for feeding paper to the removed groups of strips, a device for coating a surface of said paper with glue, and a device for applying the glue-carrying surface of the paper to the removed groups of strips to form flooring slabs.

5. A machine for the production of paper-glued flooring slabs, comprising a feed conveyor belt for feeding parquet strips placed parallel to each other upon the belt, a first distributing conveyor belt constituting a continuation of said feed belt and receiving the strips from the feed belt, a second distributing conveyor belt extending at right angles to the first distributing conveyor belt and having one end receiving strips from the first distributing conveyor belt, at least one carrier for holding a group of strips, rotary means connected with said carrier and swinging said carrier to remove a group of strips from the first distributing conveyor belt and place it upon the second distributing conveyor belt crosswise to strips received by said one end of the second distributing conveyor belt from the first distributing conveyor belt, a gluing table, a slide located adjacent the other end of the second distributing conveyor belt for removing therefrom groups of strips and placing them upon said table, paper guide rollers above said table, a device for coating a surface of paper upon said rollers with glue, and rollers pressing the glue-carrying surface of the paper to the removed groups of strips to form flooring slabs.

6. A machine for the production of paper-glued flooring slabs, comprising a feed conveyor belt for feeding parquet strips placed parallel to each other upon the belt, a first distributing conveyor belt constituting a continuation of said feed belt and receiving the strips from the feed belt, a second distributing conveyor belt extending at right angles to the first distributing conveyor belt and having one end receiving strips from the first distributing conveyor belt, at least one carrier for holding a group of strips, rotary means connected with said carrier and swinging said carrier to remove a group of strips from the first distributing conveyor belt and place it upon the second distributing conveyor belt crosswise to strips received by said one end of the second distributing conveyor belt from the first distributing conveyor belt, a gluing table, a slide located adjacent the other end of the second distributing conveyor belt for removing therefrom groups of strips and placing them upon said table, a device for feeding paper to the removed groups of strips, a device for coating a surface of said paper with glue, rollers pressing the glue-carrying surface of the paper to the removed groups of strips, a cut-off knife, pneumatic means operating said knife to cut off the paper between two slabs, and a tiltable support table for removing the cut-off slabs.

7. A machine for the production of paper-glued flooring slabs, comprising a feed conveyor belt for feeding parquet strips placed parallel to each other upon the belt, a first distributing conveyor belt constituting a continuation of said feed belt and receiving the strips from the feed belt, a second distributing conveyor belt extending at right angles to the first distributing conveyor belt and having one end receiving strips from the first distributing conveyor belt, a drive motor for said conveyor belts, an electrical circuit for said drive motor, a selenium cell included in said circuit and controlling the feed of the parquet strips upon the belts, means connected with said motor and actuated by said selenium cell to stop said motor as soon as the feed of the parquet strips ceases, at least one carrier for holding a group of strips, rotary means connected with said carrier and swinging said carrier to remove a group of strips from the first distributing conveyor belt and place it upon the second distributing conveyor belt crosswise to strips received by said one end of the second distributing conveyor belt from the first distributing conveyor belt, a slide located adjacent the other end of the second distributing conveyor belt for removing therefrom groups of strips, a device for feeding paper to the removed groups of strips, a device for coating a surface of said paper with glue, and a device for applying the glue-carrying surface of the paper to the removed groups of strips to form flooring slabs.

References Cited in the file of this patent

UNITED STATES PATENTS

| | | |
|---|---|---|
| 1,491,335 | Childers | Apr. 22, 1924 |
| 2,401,648 | Kahr | June 4, 1946 |